(12) United States Patent
Chernega

(10) Patent No.: US 9,190,950 B2
(45) Date of Patent: Nov. 17, 2015

(54) ELECTRONIC FITNESS DEVICE

(71) Applicant: John O. Chernega, State College, PA (US)

(72) Inventor: John O. Chernega, State College, PA (US)

( * ) Notice: Subject to any disclaimer, the term of this patent is extended or adjusted under 35 U.S.C. 154(b) by 284 days.

(21) Appl. No.: 14/016,510

(22) Filed: Sep. 3, 2013

(65) Prior Publication Data

US 2014/0062347 A1  Mar. 6, 2014

Related U.S. Application Data

(60) Provisional application No. 61/696,249, filed on Sep. 3, 2012.

(51) Int. Cl.
*H02P 7/00* (2006.01)
*H02P 29/00* (2006.01)
*H02P 7/288* (2006.01)

(52) U.S. Cl.
CPC ............... *H02P 29/00* (2013.01); *H02P 7/288* (2013.01)

(58) Field of Classification Search
CPC ................... H02P 29/00; H02P 7/288
USPC ......... 318/119, 126, 127, 128, 451, 481, 494, 318/514, 466, 266; 340/572.8, 612, 614, 340/648, 665, 683
See application file for complete search history.

(56) References Cited

U.S. PATENT DOCUMENTS

| 5,808,540 A * | 9/1998 | Wheeler et al. ............... 338/114 |
| 8,106,781 B2 * | 1/2012 | Pietersen .................... 340/573.1 |
| 2011/0057584 A1 * | 3/2011 | Nishikimi ........................ 318/17 |
| 2011/0181430 A1 * | 7/2011 | Hu et al. ........................ 340/657 |

* cited by examiner

*Primary Examiner* — Bentsu Ro
*Assistant Examiner* — Thai Dinh
(74) *Attorney, Agent, or Firm* — McNees Wallace & Nurick LLC

(57) ABSTRACT

An electronic fitness device is provided, the electronic fitness device including an enclosure having a cover, a motor positioned within the enclosure, a circuit board, a variable resistor positioned on the circuit board, the variable resistor comprising a first trace, a second trace, and a semiconductive film disposed over the first trace and the second trace, and control circuitry coupled to at least the motor and the circuit board. The cover is positioned to press the semiconductive film against the first trace and the second trace in response to a pressure applied to the cover, and the control circuitry is configured to actuate the motor in response to a change in the resistance between the first trace and the second trace resulting from the pressure applied to the cover. Also provided are a method of monitoring abdominal muscle position, and control circuitry.

20 Claims, 4 Drawing Sheets

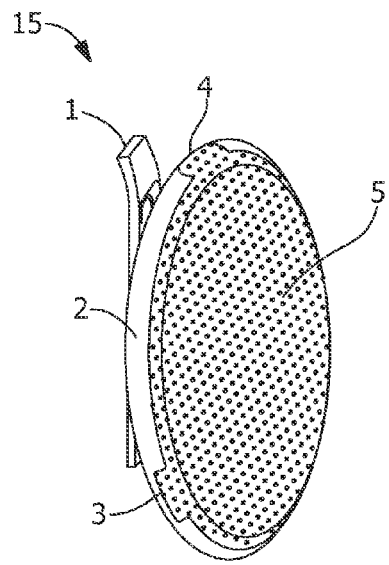
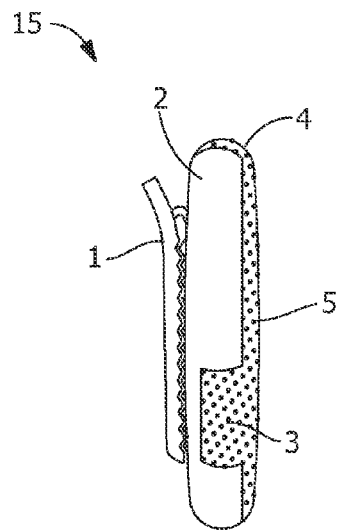
FIG. 1          FIG. 2
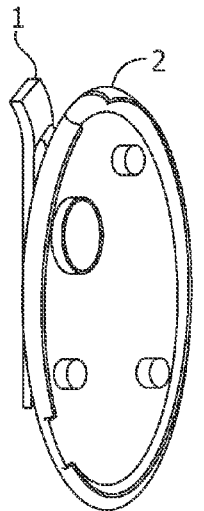 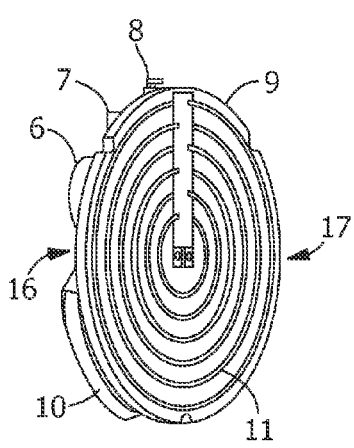 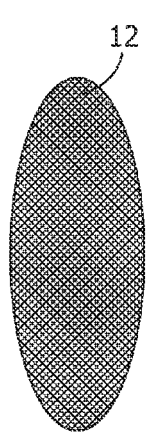 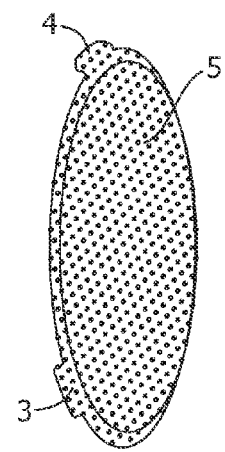
FIG. 3A      FIG. 3B      FIG. 3C      FIG. 3D

ELECTRONIC FITNESS DEVICE

RELATED APPLICATION

This application claims priority to and the benefit of U.S. Provisional Patent Application Ser. No. 61/696,249, filed Sep. 3, 2012, titled "Abdominal Muscle Trainer", which is hereby incorporated by reference in its entirety.

FIELD OF THE INVENTION

The present invention is directed to an electronic fitness device, a method of using an electronic fitness device, and a pressure sensing circuit. More specifically, the present invention is directed to an electronic fitness device for training a person's abdominal muscles, a method of monitoring a person's abdominal muscle position with an electronic fitness device, and a pressure sensing circuit for use in an electronic fitness device.

BACKGROUND OF THE INVENTION

People often seek to increase their overall fitness level by losing weight and/or increasing their muscle mass. One area of particular interest includes an individual's stomach. It has been suggested that by exercising good posture and making an effort to maintain a tightened muscle condition of the abdominal muscles an individual may realize a substantial benefit in posture, weight control, back health, and/or core strength, while also helping to reduce or avoid back pain.

However, for a variety of reasons, many people are unable to effectively exercise their abdominal muscles. One common problem most individuals experience is a difficulty remembering to exercise good posture and to maintain tightened abdominal muscles as they go about their day. As a result, an undue number of people suffer from increased weight carried in the abdominal region and decreased core strength.

Although there have been prior attempts to provide devices which remind individuals to tighten their abdominal muscles, the existing devices are often uncomfortable, non-adjustable, incorporated as part of a larger article (e.g., a belt), or distracting to other individuals.

Therefore, an electronic fitness device that does not suffer from one or more of the above drawbacks would be desirable in the art.

BRIEF DESCRIPTION OF THE INVENTION

In an exemplary embodiment, an electronic fitness device includes an enclosure comprising a case and a cover, a motor positioned within the enclosure, a circuit board positioned between the case and the cover, a variable resistor positioned on the circuit board, the variable resistor comprising a first trace, a second trace, and a semiconductive film disposed over the first trace and the second trace, and control circuitry coupled to at least the motor and the circuit board. The semiconductive film is positioned between the circuit board and the cover. The cover is positioned to press the semiconductive film against the first trace and the second trace in response to a pressure applied to the cover. A resistance between the first trace and the second trace varies inversely in response to the applied pressure on the semiconductive film, and the control circuitry is configured to actuate the motor in response to a change in the resistance between the first trace and the second trace.

In another exemplary embodiment, a method of monitoring abdominal muscle position includes positioning an electronic fitness device between a belt worn by a user and a user's abdomen, applying pressure to a cover of the electronic fitness device, the cover pressing a semiconductive film against a first trace and a second trace to vary a resistance between the first trace and the second trace, obtaining a threshold resistance value by measuring an initial resistance between the first trace and the second trace and storing the initial resistance as the threshold resistance value, measuring and storing the resistance between the first trace and the second trace to obtain a measured resistance value, comparing the measured resistance value to the threshold resistance value, and actuating a motor to vibrate the electronic fitness device when the measured resistance value is less than the threshold resistance value.

In another exemplary embodiment, a control circuitry includes a first resistor comprising a zero ohm resistor, a motor, a variable resistor comprising traces on a circuit board and a semiconductive film disposed over the traces, a second integrated circuit configured to measure a resistance of the variable resistor with a third resistor and a measurement capacitor, and actuate the motor when the resistance of the variable resistor falls below a threshold value, a switch to toggle the second integrated circuit between a first mode and a second mode, a first integrated circuit to regulate a voltage provided to the second integrated circuit, a third integrated circuit to regulate the voltage provided to the motor when actuated by the second integrated circuit, and a plurality of bypass capacitors to reduce transient voltage spikes on the power supply. The resistance of the variable resistor is decreased by an increased pressure applied to a semiconductive film disposed over the variable resistor.

Provided are an electronic fitness device, a method of using an electronic fitness device, and a pressure sensing circuit. Embodiments of the present disclosure, in comparison to devices and methods not using one or more of the features disclosed herein, increase user comfort, increase adjustability, increase portability, increase versatility, provide automatic threshold adjustments, reduce distraction of others, or a combination thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a perspective view of an electronic fitness device according to an embodiment of the disclosure.

FIG. 2 is a side view of an electronic fitness device according to an embodiment of the disclosure.

FIG. 3A is a perspective view of a case according to an embodiment of the disclosure.

FIG. 3B is a perspective view of a circuit board according to an embodiment of the disclosure.

FIG. 3C is a perspective view of a semiconductive film according to an embodiment of the disclosure.

FIG. 3D is a perspective view of a cover according to an embodiment of the disclosure.

Wherever possible, the same reference numbers will be used throughout the drawings to represent the same parts.

DETAILED DESCRIPTION OF THE INVENTION

Figure 4:
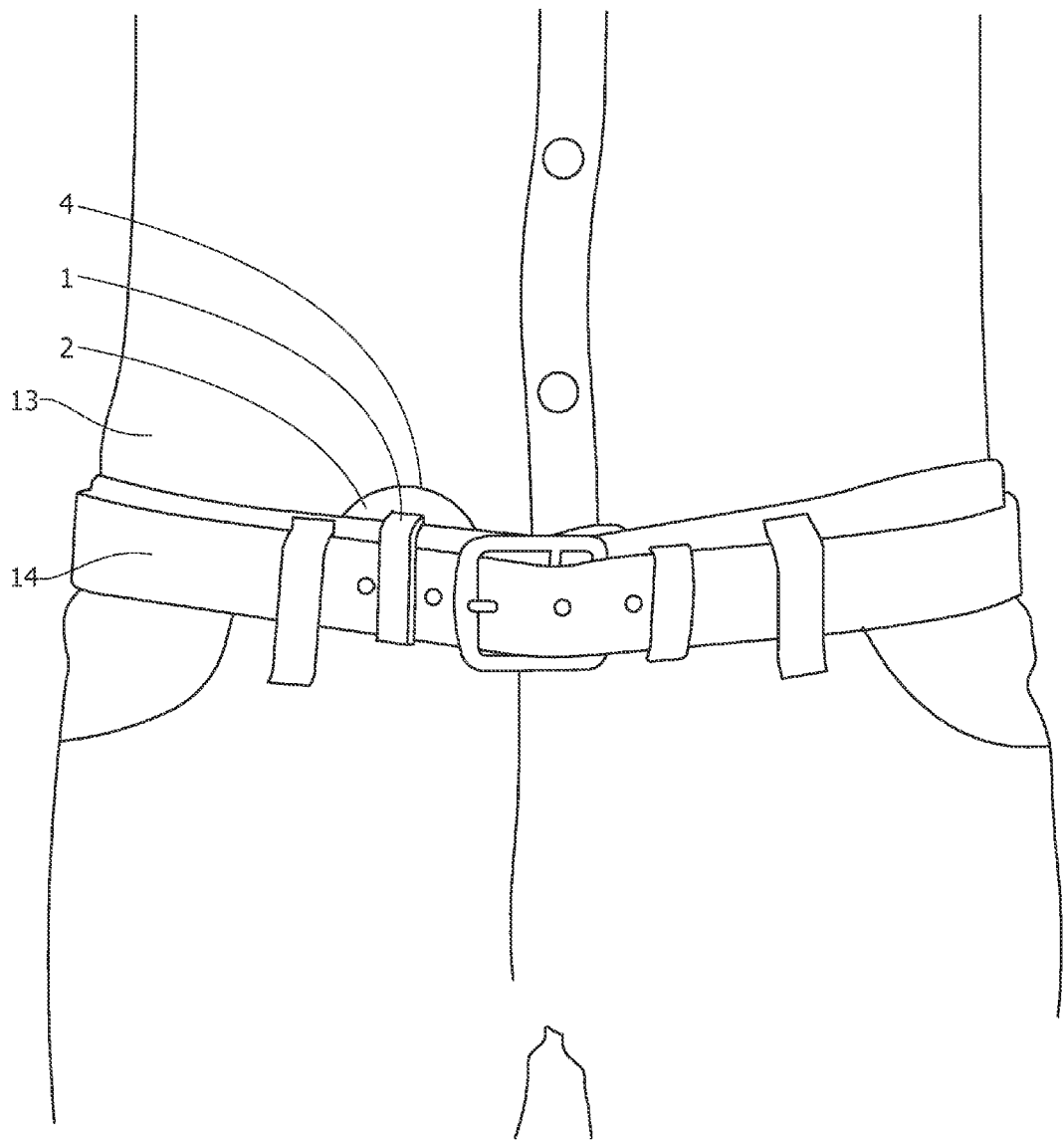
FIG. 4 is a perspective view of an electronic fitness device attached to a user's belt according to an embodiment of the disclosure.

Referring to FIGS. 1-3D, in one embodiment, an electronic fitness device includes an enclosure 15 having a clip 1, a case 2, and a cover 5 secured to the case 2. A circuit board 9 is positioned adjacent to the case 2, the circuit board 9 having a first side facing the case 2 and a second side facing the cover 5.

The first side of the circuit board 9 includes a motor 6, control circuitry 7, a switch 8, and a power source 10. The motor 6 includes any suitable motor for providing feedback such as, but not limited to, a vibrator motor (i.e. 310-101 10 mm Coin Vibrator Motor manufactured by Precision Microdrives™). The cover 5 includes a compressible section 4 to permit operation of the switch 8 through the cover 5, and a movable flap 3 to provide access to the power source 10 within the enclosure 15. The power source 10 includes any suitable power supply such as, but not limited to, a battery. In one embodiment, the power source 10 may include a pair of lithium coin 3 volt (CR2450) batteries connected in series.

The second side of the circuit board 9 includes at least a variable resistor. In one embodiment, the variable resistor includes traces 11 and a semiconductive film 12 disposed over the traces. The traces 11 include at least two traces such as, but not limited to, a first trace 11a and a second trace 11b. The first trace 11a may include a first plurality of traces in electronic communication with each other. The second trace 11b may include a second plurality of traces in electronic communication with each other. In one embodiment, the first trace 11a and the second trace 11b are interlaced. In another embodiment, the first trace 11a and the second trace 11b are electrically isolated from each other. For example, the first trace 11a and the second trace 11b may be parallel to each other. In another example, the first trace 11a and the second trace 11b may form concentric spaced-apart rings as shown in FIG. 3B.

The semiconductive film 12 is positioned between the circuit board 9 and the cover 5. When pressure is applied to the electronic fitness device, the cover 5 presses the semiconductive film 12 into the traces 11, increasing contact between the traces 11 and the semiconductive film 12 and decreasing the resistance of the variable resistor. For example, in one embodiment, the cover 5 may be a deformable cover for transferring an applied pressure directly to the semiconductive film 12.

Referring to FIG. 4, in one embodiment, the clip 1 secures the enclosure 15 to any suitable article of clothing 14 situated around a user 13. A suitable article of clothing includes, but is not limited to, a belt, a waistband, or a combination thereof. In another embodiment, when the enclosure 15 is secured to the article of clothing 14, the compressible section 4 is positioned to permit the user 13 to operate the switch 8. Operating the switch 8 toggles the control circuitry 7 between a first mode and a second mode. For example, in one embodiment, the operating switch 8 toggles the control circuitry 7 between an on position and an off position. In another example, the operating switch 8 toggles the control circuitry 7 between an operating mode and a sleep mode. When in the on position or the operating mode, the control circuitry 7 measures a resistance between the traces 11 on the circuit board 9.

Figure 5:
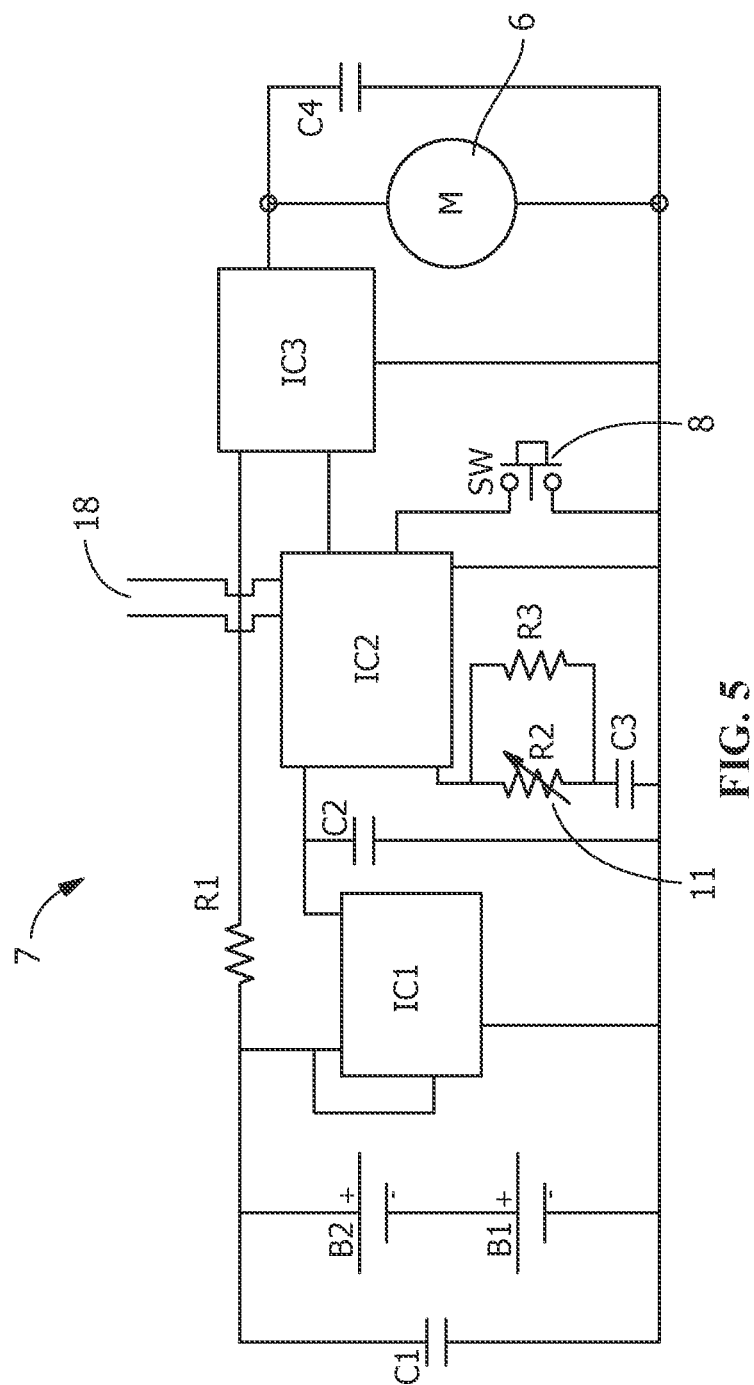
FIG. 5 shows an electrical diagram schematic of a control circuit for an electronic fitness device according to an embodiment of the disclosure.

Referring to FIG. 5, in one embodiment, the control circuitry 7 for the electronic fitness device is shown schematically, including the power source 10 (B1, B2), a first resistor (R1), the motor 6 (M), a second resistor (R2), a third resistor (R3), a measurement capacitor (C3), a first integrated circuit (IC1), a second integrated circuit (IC2), a third integrated circuit (IC3), the switch 8 (SW), a plurality of bypass capacitors (C1, C2, C4), and an interface 18 for connecting to a remote device. In another embodiment, R2 is the variable resistor including the traces 11 and the semiconductive film 12. IC2 measures the resistance of R2 with C3, while R3 sets a maximum resistance of R2 and R3 connected in parallel. IC2 also actuates the motor 6 in response to changes in the measured resistance of R2, as described in further detail below. In one exemplary embodiment, IC2 may be a microprocessor such as an 8 pin SOIC microcontroller (PIC12F519), C3 may be a 0.1 µF capacitor, and R3 may be a 100 kOhm resistor.

In another embodiment, IC1 and IC3 are voltage regulators such as 5 pin SOT25 3.3V regulators (29-XC6221). In a further embodiment, IC1 regulates a voltage provided to IC2 by the power source 10, and IC3 regulates the voltage provided to the motor 6 when actuated by IC2. R1 may be a zero ohm resistor that bridges a gap on the circuit board 9. C1, C2, and C4 are positioned within the control circuitry 7 to reduce or eliminate interference with operation of the control circuitry 7 from transient voltage spikes on the battery 10. In one example, C1 may be a 10 µF capacitor, while C2 and C4 may be 1 µF capacitors.

Figure 6:
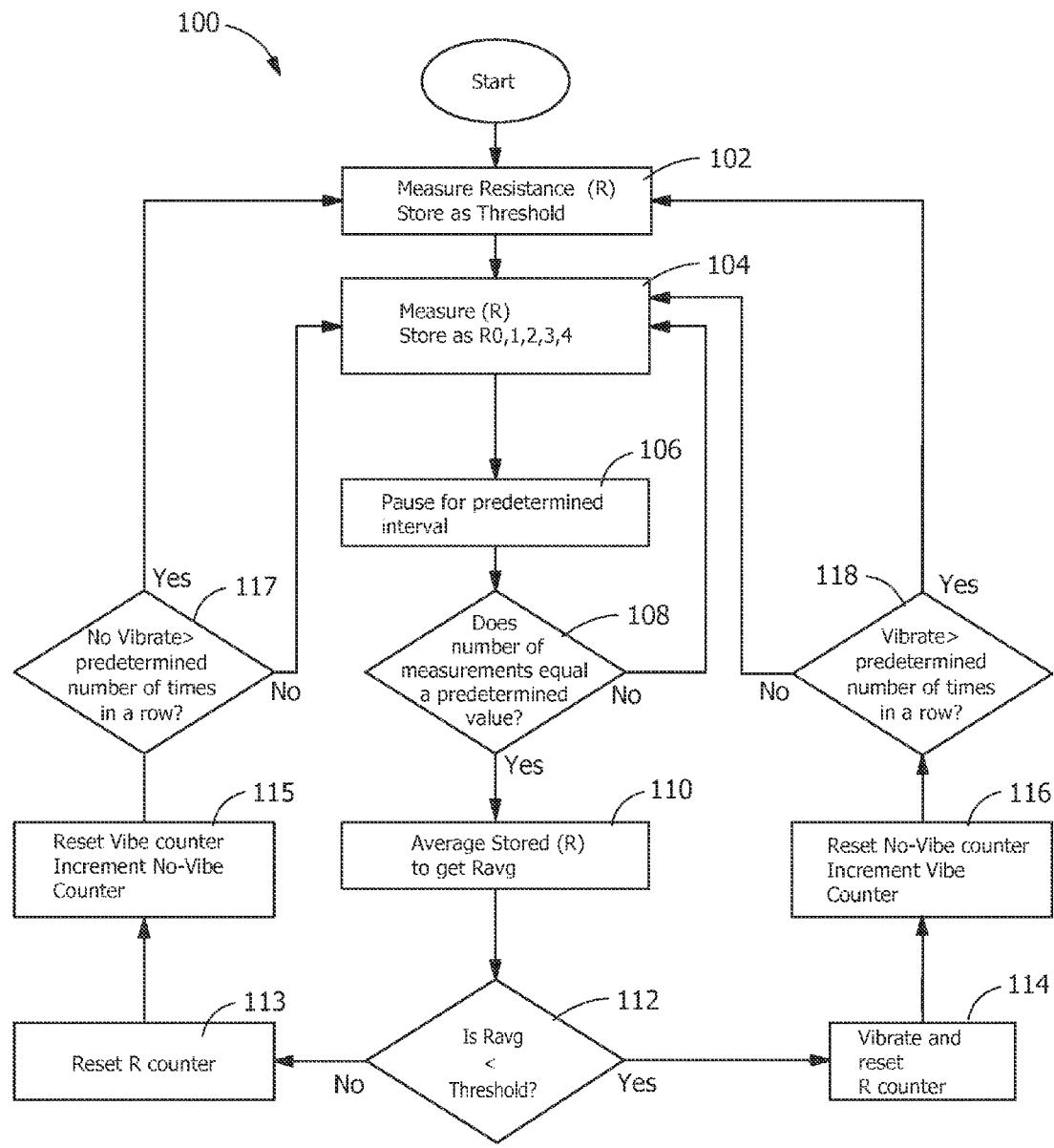
FIG. 6 is a flow chart of a method of monitoring abdominal muscle position.

Referring to FIG. 6, in one embodiment, a method 100 of monitoring abdominal muscle position includes positioning the electronic fitness device between the article of clothing 14 worn by the user 13 and a user's abdomen and pressing the compressible section 4 to operate the switch 8 and activate the electronic fitness device. The positioning of the electronic fitness device causes the user's abdomen to apply pressure to the cover 5, which presses the semiconductive film 12 against the first trace 11a and the second trace 11b on the circuit board 9 in response to the pressure from the user's abdomen. For example, in one embodiment, the resistance between the first trace 11a and the second trace 11b is inversely proportional to the pressure applied to the cover 5. In this embodiment, when the user 13 relaxes their abdominal muscles, their abdomen exerts increased pressure on the cover 5 and decreases the resistance between the first trace and the second trace.

Next, the control circuitry 7 obtains the threshold resistance value (step 102) by measuring an initial resistance between the first trace 11a and the second trace 11b, then storing the initial resistance as the threshold resistance value. Once the threshold resistance value has been obtained (step 102) the control circuitry 7 measures and stores a measured resistance between the first trace and the second trace (step 104). In one embodiment, the control circuitry 7 iteratively repeats the measurement and storage of the resistance between the first trace and the second trace (step 104) a plurality of times as described in further detail below. Between each measurement, the control circuitry 7 pauses for a predetermined interval, e.g., 1 second (step 106), before calculating the number of stored measurements with a resistance counter and comparing the number of stored measurements to a predetermined number of stored measurements (step 108). A suitable number of predetermined stored measurements includes, but is not limited to, at least 2, at least 5, at least 10, between 2 and 10, or any suitable combination, sub-combination, range, or sub-range thereof.

When the number of stored measurements equals the predetermined number of measurements, the control circuitry 7 averages the stored measurements (step 110) to obtain a measured resistance value. The measured resistance value is then compared to the threshold resistance value (112). If the measured resistance value is less than the threshold resistance value the motor 6 is actuated and the resistance counter is reset (step 114). Actuation of the motor 6 reminds the user 13 to tense their abdominal muscles and reduce the pressure exerted on the cover 5. If the measured resistance value is at least equal to the threshold resistance value the resistance counter is reset and the motor 6 is not actuated (step 115).

In one alternate embodiment, the control circuitry 7 measures and stores the resistance between the first trace 11a and the second trace 11b (step 104) a single time to obtain the measured resistance value without averaging multiple resistance measurements. In another alternate embodiment, the control circuitry 7 repeatedly measures and stores the resistance between the first trace and the second trace (step 104) over a predetermined period of time, then averages the stored measurements (step 110) to obtain the measured resistance value.

In one embodiment, the method 100 automatically adjusts the threshold resistance value in response to changing conditions such as, but not limited to, changes in user position, user fatigue, increased exertion level by the user 13, or a combination thereof. The automatic adjustment includes the use of a vibration counter and a non-vibration counter to determine if the difficulty level is too high or too low, respectively. The vibration counter measures a number of times the motor 6 has been consecutively actuated, and the non-vibration counter measures a number of times the motor 6 has consecutively not been actuated. For example, in one embodiment, each time the motor 6 is actuated the non-vibration counter is reset and the vibration counter is increased by one increment (step 116). Conversely, each time the motor 6 is not actuated, the vibration counter is reset and the non-vibration counter is increased by one increment (step 115). By resetting the non-vibration counter or the vibration counter each time the motor 6 is actuated or not actuated, respectively, the method 100 tracks only the number of times the motor 6 has been consecutively actuated or not actuated.

To determine if the difficulty level is too high, after each actuation of the motor 6, the number of consecutive actuations is compared to a predetermined number of times (step 118). If the number of consecutive actuations is at most equal to the predetermined number of times, the control circuitry 7 repeats method 100 from the measurement and storage of the measured resistance (step 104). Conversely, if the number of consecutive actuations is greater than the predetermined number it indicates that the difficulty level may be too high, and therefore a new threshold resistance value is desired. In response, the control circuitry 7 measures a new initial resistance and stores the new initial resistance as the new threshold resistance value (step 102).

To determine if the difficulty level it too low, after each non-actuation of the motor 6, the number of consecutive non-actuations is compared to the predetermined number of times (step 117). If the number of consecutive non-actuations is at most equal to the predetermined number of times, the control circuitry 7 repeats method 100 from the measurement and storage of the measured resistance (step 104). Conversely, if the number of consecutive non-actuations is greater than the predetermined number it indicates that the difficulty level may be too low, and therefore a new threshold resistance valued is desired. In response, the control circuitry 7 measures a new initial resistance and stores the new initial resistance as the new threshold resistance value (step 102).

In one embodiment, the control circuitry 7 transmits any suitable data through the interface 18 with the remote device. The remote device is any suitable device for storing and/or analyzing data such as, but not limited to, a computer, a tablet device, a smart phone, or a combination thereof. The data may then be stored and/or analyzed on the remote device to visualize and track performance, share with other users, transfer to social media sites, encourage continued use of the device by the user 13, or a combination thereof. Suitable data includes, but is not limited to, resistance measurements, average resistance, number of times the threshold value was increased and/or decreased, duration at the threshold value, duration of use, number of times the motor 6 was actuated, number of times the motor 6 was not actuated, or a combination thereof In one embodiment, the interface 18 may include any suitable wired connection such as, but are not limited to, a universal serial bus (USB) connection, a firewire connection, or a combination thereof. In another embodiment, the interface 18 may include a wireless network interface circuit in place of, or in addition to, the wired connection. In a further embodiment, the wireless network interface circuit may be, for example, IEEE 802.15 standard (i.e. Bluetooth, Zigbee), a proprietary wireless sensor protocol (i.e. ANT by Dynastream Innovations Inc.), or a combination thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic fitness device, comprising:
   an enclosure, comprising:
      a case; and
      a cover;
   a motor positioned within the enclosure;
   a circuit board positioned between the case and the cover;
   a variable resistor positioned on the circuit board, the variable resistor comprising:
      a first trace;
      a second trace; and
      a semiconductive film disposed over the first trace and the second trace; and
   control circuitry coupled to at least the motor and the circuit board;
   wherein the semiconductive film is positioned between the circuit board and the cover;
   wherein the cover is positioned to press the semiconductive film against the first trace and the second trace in response to a pressure applied to the cover;
   wherein a resistance between the first trace and the second trace varies inversely in response to the applied pressure on the semiconductive film; and
   wherein the control circuitry is configured to actuate the motor in response to a change in the resistance between the first trace and the second trace.

2. The device of claim 1, further comprising a clip secured to the enclosure.

3. The device of claim 1, wherein the first trace comprises a first plurality of traces.

4. The device of claim 3, wherein the second trace comprises a second plurality of traces.

5. The device of claim 4, wherein the traces in the first plurality of traces are in electrical communication, and the traces in the second plurality of traces are in electrical communication.

6. The device of claim 5, wherein the first plurality of traces is electrically isolated from the second plurality of traces.

7. The device of claim 4, wherein the first plurality of traces and the second plurality of traces are interlaced.

8. The device of claim 4, wherein the first plurality of traces and the second plurality of traces are spaced evenly apart on the circuit board.

9. The device of claim 1, wherein the control circuitry is configured to provide connection to a remote device through a connection device selected from the group consisting of a wired connection, and a wireless network interface circuit.

10. A method of monitoring abdominal muscle position, comprising:
   (a) positioning an electronic fitness device between an article of clothing worn by a user and a user's abdomen;
   (b) applying pressure to a cover of the electronic fitness device, the cover pressing a semiconductive film against a first trace and a second trace to vary a resistance between the first trace and the second trace;
   (c) obtaining a threshold resistance value by measuring an initial resistance between the first trace and the second trace and storing the initial resistance as the threshold resistance value;
   (d) measuring and storing the resistance between the first trace and the second trace to obtain a measured resistance value;
   (e) comparing the measured resistance value to the threshold resistance value; and
   (f) actuating a motor to vibrate the electronic fitness device when the measured resistance value is less than the threshold resistance value.

11. The method of claim 10, further comprising:
   measuring and storing the resistance between the first trace and the second trace in step (d) a plurality of times;
   pausing for a predetermined interval after each measurement in step (d);
   calculating the number of stored measurements with a resistance counter;
   comparing the number of stored measurements to a predetermined value;
   repeating step (d) when the number of stored measurements is not equal to the predetermined value; and
   averaging the stored measurements to obtain the measured resistance value when the number of stored measurements equals the predetermined value.

12. The method of claim 10, further comprising:
   repeatedly measuring and storing the resistance between the first trace and the second trace in step (d) over a predetermined period of time; then
   averaging the stored measurements to obtain the measured resistance value.

13. The method of claim 10, comprising measuring a number of times the motor has consecutively been actuated with a vibration counter.

14. The method of claim 13, comprising obtaining a new threshold resistance value when the number of times the motor has consecutively been actuated is greater than a predetermined number of times, and repeating the method from step (d) when the number of times the motor has consecutively been actuated is at most equal to the predetermined number.

15. The method of claim 10, comprising measuring a number of times the motor has consecutively not been actuated with a non-vibration counter.

16. The method of claim 15, comprising obtaining a new threshold resistance value when the number of times the motor has consecutively not been actuated is greater than a predetermined number of times, and repeating the method from step (d) when the number of times the motor has consecutively not been actuated is at most equal to the predetermined number.

17. The method of claim 10, comprising storing performance data, and transmitting the performance data to a remote device through an interface selected from the group consisting of a wired connection, and a wireless network interface circuit.

18. A control circuitry, comprising:
   a first resistor comprising a zero ohm resistor;
   a motor;
   a variable resistor comprising:
      traces on a circuit board; and
      a semiconductive film disposed over the traces;
   a second integrated circuit configured to measure a resistance of the variable resistor with a third resistor and a measurement capacitor, and actuate the motor when the resistance of the variable resistor falls below a threshold resistance value;
   a switch to toggle the second integrated circuit between a first mode and a second mode;
   a first integrated circuit to regulate a voltage provided to the second integrated circuit;
   a third integrated circuit to regulate the voltage provided to the motor when actuated by the second integrated circuit; and
   a plurality of bypass capacitors to reduce transient voltage spikes on the power supply;
   wherein the resistance of the variable resistor is decreased by an increased pressure applied to the semiconductive film.

19. The pressure sensing circuit of claim 18, comprising an interface for connecting to a remote device.

20. The pressure sensing circuit of claim 19, wherein the interface includes at least one connection selected from the group consisting of a wired connection, and a wireless network interface circuit.

* * * * *